United States Patent
Kellermann et al.

(10) Patent No.: US 10,444,022 B2
(45) Date of Patent: Oct. 15, 2019

(54) METHODS AND SYSTEMS FOR PROMOTING ENVIRONMENTALLY FRIENDLY TRANSPORTATION MECHANISMS

(71) Applicant: SIEMENS AKTIENGESELLSCHAFT, München (DE)

(72) Inventors: Astrid Kellermann, München (DE); Christian Schwingenschlögl, Grafing (DE)

(73) Assignee: Siemens Aktiengesellschaft, München (DE)

( * ) Notice: Subject to any disclaimer, the term of this patent is extended or adjusted under 35 U.S.C. 154(b) by 85 days.

(21) Appl. No.: 15/550,604

(22) PCT Filed: Oct. 26, 2015

(86) PCT No.: PCT/EP2015/074749
§ 371 (c)(1),
(2) Date: Aug. 11, 2017

(87) PCT Pub. No.: WO2016/128078
PCT Pub. Date: Aug. 18, 2016

(65) Prior Publication Data
US 2018/0031379 A1    Feb. 1, 2018

(30) Foreign Application Priority Data
Feb. 12, 2015    (DE) .................. 10 2015 202 578

(51) Int. Cl.
*G01C 21/34*    (2006.01)
*G08G 1/0969*    (2006.01)
*G08G 1/0968*    (2006.01)

(52) U.S. Cl.
CPC ...... *G01C 21/3423* (2013.01); *G01C 21/3469* (2013.01); *G01C 21/3492* (2013.01); *G08G 1/0969* (2013.01); *G08G 1/096838* (2013.01)

(58) Field of Classification Search
CPC ............ G01C 21/3423; G01C 21/3469; G01C 21/3492; G06Q 10/047; G06Q 50/30;
(Continued)

(56) References Cited

U.S. PATENT DOCUMENTS 8,949,028 B1 *    2/2015    Klampfl ............. G01C 21/3423
                                                         701/527
2005/0004757 A1    1/2005    Neeman et al.
(Continued)

FOREIGN PATENT DOCUMENTS

CN    101154318 A    4/2008
CN    103310632 A    9/2013
(Continued)

OTHER PUBLICATIONS

Korean Patent Application No. 9-5-2018-043944403, dated Jun. 28, 2018.
(Continued)

*Primary Examiner* — Quan-Zhen Wang
*Assistant Examiner* — Rajsheed O Black-Childress
(74) *Attorney, Agent, or Firm* — Lempia Summerfield Katz LLC

(57) ABSTRACT

Traffic management methods for promoting environmentally friendly transportation include the following acts: transmitting, by a routing unit to a requesting road user, computed traffic route proposals that include different transport mechanisms; selecting a traffic route from the transmitted traffic route proposals, by the requesting road user, and transmitting the selected traffic route to the routing unit, which provides the road user with traffic route data for the selected
(Continued)

traffic route; transmitting position data, from the road user, along the traffic route taken by the road user in order to validate the transportation mechanism used by the road user in the process; and rating a behavior of the road user based on the transportation used by the road user.

19 Claims, 4 Drawing Sheets

(58) Field of Classification Search
CPC .............. G08G 1/005; G08G 1/096816; G08G 1/096822; G08G 1/096838; G08G 1/096844; G08G 1/0969; G08G 1/202
See application file for complete search history.

(56) References Cited

U.S. PATENT DOCUMENTS

| | | | |
|---|---|---|---|
| 2008/0059061 | A1 | 3/2008 | Lee |
| 2009/0287408 | A1 | 11/2009 | Gerdes et al. |
| 2012/0209522 | A1 | 8/2012 | Gollnick |
| 2012/0221230 | A1 | 8/2012 | Reilhac et al. |
| 2013/0054132 | A1* | 2/2013 | Conner .............. G01C 21/3407 701/411 |
| 2014/0365113 | A1 | 12/2014 | McGavran et al. |
| 2015/0206166 | A1 | 7/2015 | Fletcher et al. |

FOREIGN PATENT DOCUMENTS

| | | |
|---|---|---|
| DE | 102009053080 A1 | 5/2011 |
| DE | 102011011213 A1 | 8/2012 |
| EP | 2708850 A1 | 3/2014 |
| JP | 2002230385 A | 8/2002 |
| JP | 2002277270 A | 9/2002 |
| KR | 20090000417 A | 1/2009 |
| KR | 20100021133 A | 2/2010 |
| WO | WO2011135661 A1 | 11/2011 |
| WO | WO2014080380 A2 | 5/2014 |

OTHER PUBLICATIONS

PCT International Examination Report dated Apr. 25, 2017 for corresponding PCT/EP2015/074749, with English Translation.
PCT International Search Report and Written Opinion of the International Searching Authority dated Feb. 4, 2016 for corresponding PCT/EP2015/074749, with English Translation.
Chinese Office Action for related Chinese Application No. 201580075978.7 dated May 21, 2018.
Japanese Office Action for related Japanese Application No. 2017-542031, dated May 21, 2018, with English translation.

* cited by examiner

METHODS AND SYSTEMS FOR PROMOTING ENVIRONMENTALLY FRIENDLY TRANSPORTATION MECHANISMS

The present patent document is a § 371 nationalization of PCT Application Serial Number PCT/EP2015/074749, filed Oct. 26, 2015, designating the United States, which is hereby incorporated by reference, and this patent document also claims the benefit of DE 10 2015 202 578.0, filed Feb. 12, 2015, which is also hereby incorporated by reference.

TECHNICAL FIELD

The disclosure relates to methods and systems for promoting environmentally friendly transportation mechanisms, in particular transportation mechanisms with low emissions.

BACKGROUND

Traffic networks, in particular in urban areas, are increasingly meeting the limits of their load capacity. In particular, the increasing motorized road traffic is resulting in negative consequences for the quality of the air, the noise load and for road safety.

The following documents disclose prior art relating to the technical background of the disclosure.

U.S. Patent Publication No. 2014/0365113 A1 discloses selecting and displaying navigation data or routes and a movement of a user along a selected route in a display of a mobile device.

U.S. Patent Publication No. 2008/0059061 A1 discloses that different transportation mechanisms are available on different routes, and a change of mode of transportation may be detected at a transition from one route to a subsequent route.

European Patent Application No. 2 708 850 A1 and U.S. Patent Publication No. 2005/0004757 A1 relate to further navigation devices for route planning, wherein the documents also describe that a respectively determined transportation mechanism is available to the user for specific routes.

None of these documents is concerned with how the users of the navigation devices and route planners used in the documents may be prompted to use transportation mechanisms in a more environmentally friendly way. Nor do the documents give any indication whatsoever as to how the behavior of a road user may be better selected or evaluated.

SUMMARY AND DESCRIPTION

The scope of the present disclosure is defined solely by the appended claims and is not affected to any degree by the statements within this summary. The present embodiments may obviate one or more of the drawbacks or limitations in the related art.

An object of the present disclosure is to provide a method and a system for improving the evaluation of the behavior of road users (VT).

This object is achieved by a traffic management method.

The disclosure accordingly provides a traffic management method for promoting environmentally friendly transportation mechanisms including the following acts: (1) communication of calculated traffic route proposals, which include different transportation mechanisms, by a routing unit, to a requesting road user; (2) selection of a traffic route, from the communicated traffic route proposals, by the requesting road user and transmission of the selected traffic route to the routing unit, which supplies the road user with traffic route data relating to the traffic route selected by the road user; (3) transmission of position data, of the road user, along the traffic route taken by the road user in order to validate the transportation mechanism, used in this context by the road user; and (4) evaluation of a behavior of the road user, on the basis of the transportation mechanism used by the road user.

In one possible embodiment of the method, after the receipt of a route request, from the road user, the traffic route proposals are calculated by a routing unit, which is for multiple transportation mechanisms or is specific to one transportation mechanism.

In a further possible embodiment, along the traffic route taken by the road user, the road user communicates location-related, observed traffic-relevant events to a traffic management control center, and/or to the routing unit, in an event report.

In a further possible embodiment, the routing unit calculates traffic route proposals, for road users, as a function of communicated traffic-relevant events communicated by a multiplicity of road users.

In a further possible embodiment, reported, location-related, traffic-relevant events that originate from various road users, at the same observation location, are compared with one another in order to verify and/or specify the observed traffic-relevant event.

In a further possible embodiment, after reception of a route request from a terminal of the road user, the routing unit calculates various traffic route proposals, for traffic routes, on the basis of navigation data and/or current traffic data and transmits the traffic route proposals to the terminal of the road user, for selection of a traffic route.

In a further possible embodiment, after reception of a route selection report, for selection of a traffic route, from the terminal of the road user, the routing unit transmits corresponding calculated traffic route data, for the selected traffic route, to the terminal of the road user, wherein the traffic route data are displayed, for the purpose of visualizing the selected traffic route, on a map of the road user, which is displayed on a display unit of the terminal.

In a further possible embodiment, the route selection report is transmitted from the terminal of the road user additionally to an evaluation unit, which evaluates the behavior of the road user with reference to the transportation mechanism used along the traffic route.

In a further possible embodiment, the evaluation unit calculates a traffic behavior display value, for the behavior of the road user, on the basis of emission values of the transportation mechanism used by the road user along the traffic route taken.

In a further possible embodiment, the use of a transportation mechanism with low emission values is evaluated with a higher evaluation by the evaluation unit than the use of a transportation mechanism, which has a high emission value.

In a further possible embodiment, the evaluation unit performs the evaluation of the behavior of a road user additionally as a function of the quantity and/or quality of the event reports communicated by the respective road user to the routing unit and/or to a traffic management control center.

In a further possible embodiment, the evaluation unit performs a validation of the transportation mechanism, used by the road user along the traffic route, with reference to received position data of the road user.

In a further possible embodiment, a road user, or a group of road users, sign on at the evaluation unit, for the evaluation of their behavior.

In a further possible embodiment, a road user, or a group of road users, is displayed as a user symbol with attributes at a current position along the traffic route, on one or more display units of one or more terminals of the respective road users.

In a further possible embodiment, the evaluation unit changes the displayed user symbol and/or the attributes thereof dynamically as a function of the evaluated behavior of the road user.

In a further possible embodiment, the road user is rewarded by the evaluation unit on the basis of the evaluated behavior of the road user, or the road user is rewarded at the instigation of the evaluation unit.

The disclosure also provides a traffic management system for promoting environmentally friendly transportation mechanisms with mobile terminals of road users, which transmit route requests to a routing unit, of the traffic management system, wherein the routing unit calculates, for each received route request, traffic route proposals, which include different transportation mechanisms, and communicates the traffic route proposals to the requesting road user, who selects a traffic route, whose traffic route data are transmitted to the road user via the routing unit, wherein the routing unit evaluates the position data, of the road user, along the traffic route taken by the road user, in order to validate the transportation mechanism, used in this context by the road user, and a behavior of the road user is evaluated on the basis of the transportation mechanism used by the road user.

In one possible embodiment of the traffic management system, the evaluation unit performs an evaluation of the behavior of the road user, as a function of the environmental friendliness of the transportation mechanism, used by the road user, and/or the quantity and/or quality of location-related event reports, which originate from the road user.

In a further possible embodiment, traffic management and/or transportation mechanisms are controlled by a control unit of the traffic management system as a function of the behavior of a multiplicity of road users, which is evaluated by the evaluation unit.

BRIEF DESCRIPTION OF THE DRAWINGS

Possible embodiments of the method and of the system for promoting environmentally friendly transportation will be explained in more detail below with reference to the appended figures, of which.

DETAILED DESCRIPTION

Figure 1:
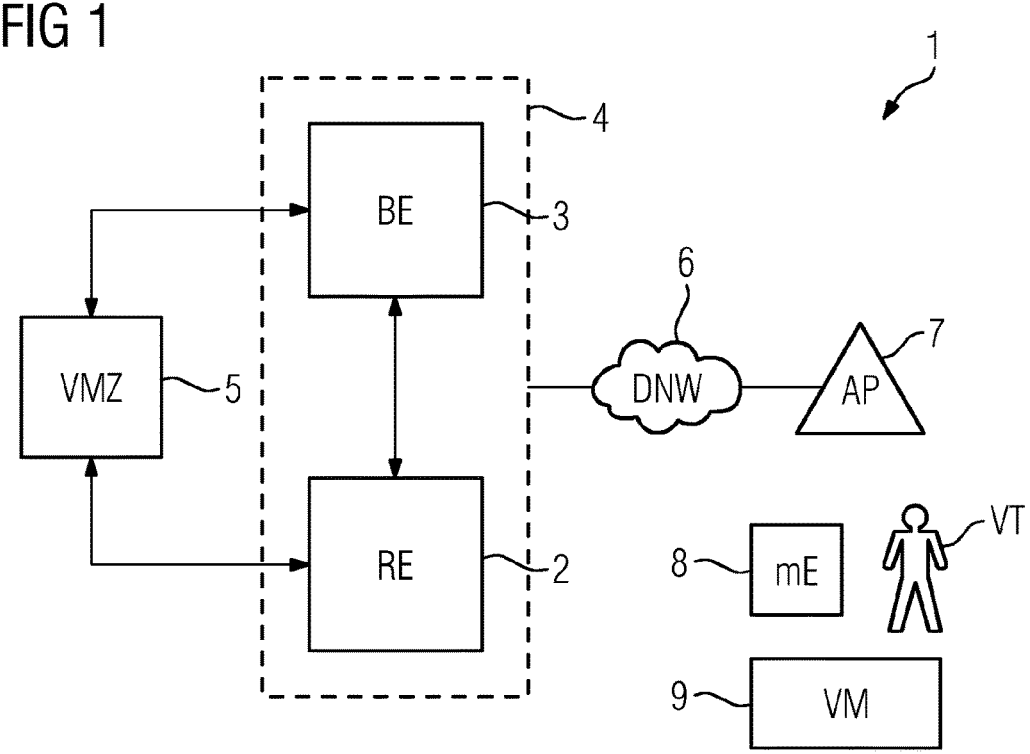
FIG. 1 depicts a diagram illustrating an exemplary embodiment of a traffic management system.

As depicted in FIG. 1, the traffic management system 1 has a routing unit 2 connected to an evaluation unit 3. The routing unit 2 and the evaluation unit 3 may be integrated in a piece of equipment 4, as in the exemplary embodiment illustrated in FIG. 1. In an alternative embodiment, the routing unit 2 and the evaluation unit 3 may also be located in different pieces of equipment connected to one another via an interface or a local data network. In the exemplary embodiment illustrated in FIG. 1, the routing unit 2 and the evaluation unit 3 are additionally connected to a traffic management control center 5. As illustrated in FIG. 1, the piece of equipment 4 may also communicate with a multiplicity of mobile terminals 8 via a data network 6 and access points 7. A mobile terminal 8 may be carried on the person of a road user VT who uses a transportation mechanism 9 along a traffic route, wherein the road user may also be on foot. The mobile terminal 8 may be a portable mobile terminal, for example, a cellphone of the road user VT. In an alternative embodiment, the mobile terminal 8 may also be integrated into the transportation mechanism 9. In the case of the transportation mechanism 9, the road user may be on foot, or the transportation mechanism may be an individual transportation device or a public transportation device or system. For example, the transportation mechanism 9 may be a transportation device used individually by the road user VT, (e.g., a bicycle or a passenger car). Alternatively, the transportation mechanism 9 may also be a transportation device or system used by the road user VT together with other road users, (e.g., a road train or a bus).

The road user VT may transmit a route request to the routing unit 2 of the traffic management system 1 from his mobile terminal 8 via the access point 7 and the data network 6. The routing unit 2 calculates, for each received route request RANF, traffic route proposals VRV that include different transportation mechanisms VM, and communicates the calculated traffic route proposals VRV to the requesting road user VT. This road user VT subsequently selects a traffic route whose traffic route data VRD are transmitted to the road user VT by the routing unit 2. The routing unit 2 evaluates the position data PD, in particular GPS data of the road user VT along the traffic route taken by the road user VT, in order to validate the transportation mechanism VM used in this context by the road user VT. Furthermore, the behavior of the road user VT is evaluated by the evaluation unit 3 on the basis of the transportation mechanism VM used by the road user VT. The evaluation unit 3 carries out an evaluation of the behavior of the road user, wherein the evaluation is performed as a function of the environmental friendliness of the transportation mechanism VM used by the road user VT as well as the quantity and/or quality of location-related event reports EM that originate from the road user VT. In one possible embodiment of the traffic management system 1 as illustrated in FIG. 1, the data may additionally be transmitted to a transportation control center 5 by the evaluation unit 3 and the routing unit 2. In one possible embodiment, the traffic management system 1 has a control unit that actuates transportation and/or traffic management. In one possible embodiment, the transportation mechanism VM and/or traffic management are actuated via the control unit that may be located, for example, in the traffic management control center 5, as a function of the behavior of a multiplicity of road users, which is evaluated by the evaluation unit 3.

Figure 2:
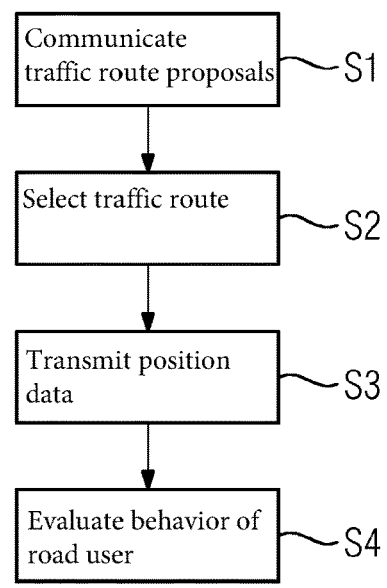
FIG. 2 depicts a flowchart illustrating an exemplary embodiment of a traffic management system.

FIG. 2 depicts a flowchart illustrating an exemplary embodiment of the traffic management method for promoting environmentally friendly transportation mechanisms.

In act S1, traffic route proposals VRV, calculated by the routing unit 2 and including different transportation mechanisms VM, are communicated to a requesting road user VT.

In act S2, a traffic route VR is selected from the communicated traffic route proposals VRV by the requesting road user VT, and this selected traffic route is transmitted to the routing unit 2, which subsequently supplies the road user VT with traffic route data VRD for the traffic route VR selected by the road user VT.

In act S3, position data PD of the road user VT along the traffic route VR taken by the road user VT are transmitted in order to validate the transportation mechanism VM used in this context by the road user. During the validation, it is checked whether the road user VT is actually using or has actually used the corresponding transportation mechanism.

In act S4, a behavior of the road user is evaluated based on the transportation mechanism VM used by the road user VT. The evaluation of the behavior is carried out by the evaluation unit 3, on the one hand as a function of the transportation mechanism VM taken by the road user and, on the other hand, as a function of event reports EM transmitted by the road user VT. Along the traffic route taken by the road user VT, the road user VT may communicate location-related, observed traffic-relevant events to the traffic management control center 5 and/or to the routing unit 2 in an event report EM. The road user VT may supply the traffic management system 1 with events observed during the travel of the road user VT with a location reference. For example, a road user may report traffic jams and other disruption observed by the road user to the traffic management system 1. For example, a road user VT may transmit traffic-relevant events to the traffic management control center 5 or the routing unit 2 in event reports EM in a written or spoken text message. The communicated event reports EM may include not only text data but also other data, in particular audio data or video data. For example, a road user VT who is seated in a vehicle may verbally input, during travel, a spoken report relating to a traffic event into a microphone, the report relating, for example, to a traffic jam observed by the road user on the opposite carriageway. The road user VT who is driving past may provide additional information about the traffic event that has occurred, (e.g., the length of the traffic jam estimated by the road user and the cause of the traffic jam observed by the road user). The greater the amount of information and the more detailed the information about the observed traffic event, the higher the quality of the event report communicated to the traffic management system 1 by the road user. In one possible embodiment, the routing unit 2 calculates traffic route proposals VRV for other road users VT as a function of the received communicated traffic-relevant events. In one possible embodiment, data processing of the traffic-relevant event report EM communicated by the road user VT takes place partially or completely automatically. The communicated event reports EM may describe traffic-relevant events in a structured or unstructured form. Received text messages or audio messages may be analyzed with respect to certain keywords. Furthermore, image data that are received and display traffic-relevant events may be evaluated automatically by object recognition algorithms. Reported, location-related, traffic-relevant events that originate from various road users VT at the same observation location, for example at an intersection or the like, may be compared with one another in order to verify and/or specify the observed traffic-relevant event. If two different road users VT1, VT2 observe, (e.g., at the same intersection), a traffic accident and report the accident independently of one another in two different event reports EM1, EM2 to the traffic management system 1, this permits the system to verify with a very high probability that the traffic event has actually taken place. Furthermore, the pieces of information that originate from different road users may complement one another and therefore permit greater accuracy of the description of the event. If the pieces of information from different road users contradict one another, they may be evaluated according to different criteria in order to obtain a description of the event that is as appropriate as possible.

In one possible embodiment, different road users VT or a group of road users may sign on together at the evaluation unit 3 or evaluation platform for the evaluation of their behavior. The behavior of a road user VT includes, on the one hand, the type of transportation VM used by the road user VT and, on the other hand, the quantity and quality of the event reports EM supplied by the road user VT.

Figure 3:
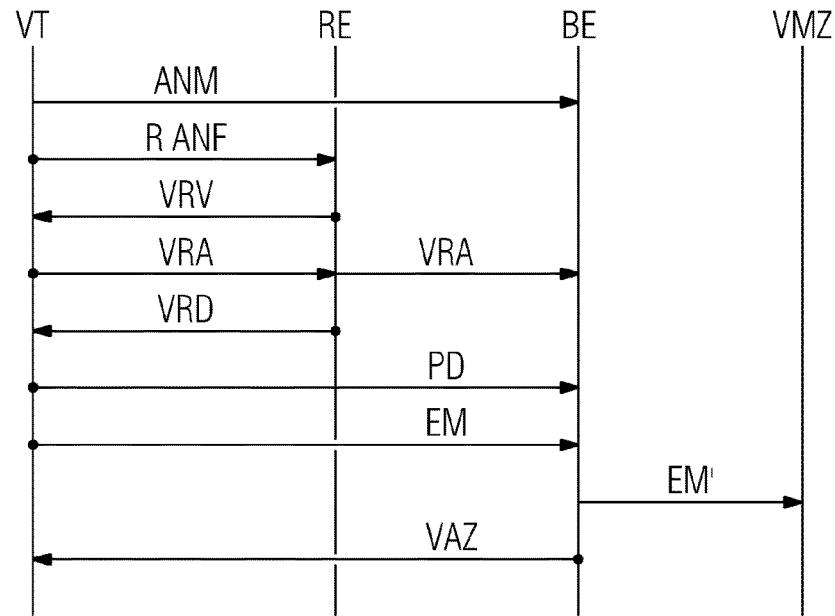
FIG. 3 depicts a signaling diagram explaining the exemplary embodiment of the traffic management system and of the traffic management method.

FIG. 3 is a schematic view of an exemplary embodiment of the traffic management method in a signaling diagram. Firstly, a road user VT may sign on at the evaluation unit 3 in a signing-on process ANM in order to participate in the traffic management method. Alternatively, a plurality of road users VT may also sign on together in a road user group VTG at the evaluation unit 3. After the receipt of a route request RANF from the signed-on road user VT, traffic route proposals VRV are calculated by the routing unit 2. In one possible embodiment, the routing unit 2 may be a routing unit for multiple transportation mechanisms that takes into account various types of transportation mechanisms VM. Alternatively, the routing unit 2 may also be a routing unit specific to one transportation mechanism, (e.g., exclusively for bicycles). The routing unit 2 communicates the various traffic route recommendations or traffic route proposals VRV to the requesting road user, as illustrated in FIG. 3. After reception of the route request RANF from the mobile terminal 8 of the road user VT, the routing unit 2 calculates various traffic route proposals VRV for traffic routes VR based on navigation data and/or current traffic data. The selected traffic route VR is communicated from the routing unit 2 to the mobile terminal 8 of the road user VT in a traffic route recommendation VRV. The participating road user VT selects a traffic route VR from the various communicated traffic route recommendations or traffic route proposals VRV and transmits the traffic route selected by the road user VT in a traffic route display report VRA both to the routing unit 2 and to the evaluation unit 3, as illustrated in FIG. 3. After reception of the route selection report for selection of the traffic route VR, the routing unit 2 transmits corresponding traffic route data VRD for the selected traffic route VR to the mobile terminal 8 of the road user VT. The traffic route data VRD of the selected traffic route is subsequently displayed to the road user on a map on a display unit or a display of the mobile terminal 8.

Figure 6:
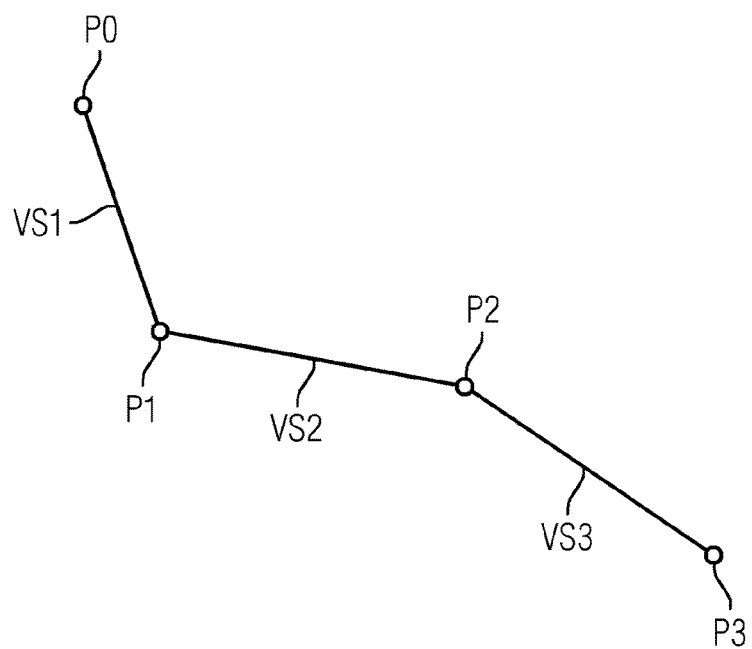
FIGS. 6, 7, and 8 depict schematic illustrations explaining the method of functioning of the traffic management method and of the traffic management system.
Figure 7:
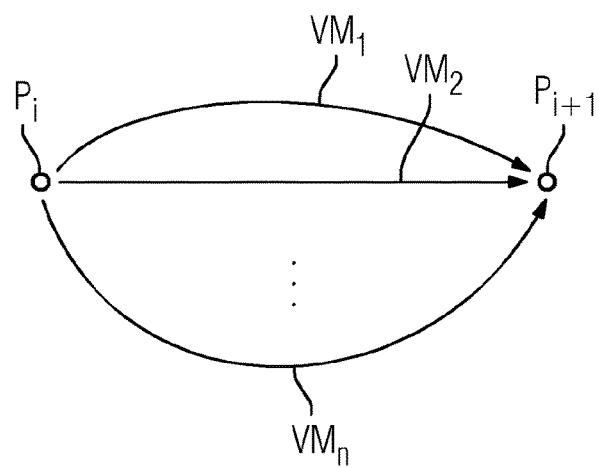

A traffic route VR may include a plurality of route sections between various traffic points that may be reached in most cases by using different transportation mechanisms VM, as illustrated schematically in FIGS. 6 and 7. The route selection report is transmitted from the terminal 8 of the road user VT to the evaluation unit 3 that evaluates the behavior of the road user with reference to the transportation mechanisms VM used by the road user along the traffic route VR. In one possible embodiment, the evaluation unit 3 calculates a traffic behavior display value VAZ, for the behavior of the road user, on the basis of emission values of the transportation mechanism VM used by the road user VT along the traffic route VR taken. In this context, the use of a transportation mechanism with low emission values is evaluated with a higher evaluation by the evaluation unit 3 than the use of a transportation mechanism with a high emission value. Various emission values relating to the $CO_2$ load and/or the noise load may be stored for various transportation mechanisms or types of transportation in a data memory. The evaluation unit 3 may evaluate, based on the stored emission values of the various transportation mechanisms VM, a traffic behavior display value VAZ for the traffic behavior of the road user VT. In one possible embodiment, the evaluation of the behavior of a road user VT is additionally carried out as a function of the quantity and/or quality of the event reports EM communicated by the respective road user VT to the routing unit 2 or the traffic management control center 5. A road user VT who transmits a large number of event reports with a high quality or high degree of detail to the traffic management system 1 is given a better or higher evaluation with respect to his behavior than a road user VT who does not supply any or only supplies a few event reports EM.

As soon as the road user VT has selected a recommended traffic route and started the journey, position data PD, (e.g., GPS data), of the road user VT are recorded. The data are communicated continuously, periodically, or in an event-oriented fashion, that is to say, e.g., at the end of each journey, when a specific location is reached, or at a specific time, or manually (e.g., via mail) to the routing unit 2 and/or the evaluation unit 3. The evaluation unit 3 may automatically perform, with reference to the received position data PD of the road user VT, validation of the transportation mechanism VM used by the road user VT along the traffic route VR taken. With reference to the position data PD, the evaluation unit 3 may, on the one hand, check whether the road user VT is actually moving or has actually moved along the recommended traffic route VR and may, on the other hand, check whether the road user VT is actually taking the recommended transportation mechanism VM with the highest level of environmental friendliness. In one possible embodiment, the evaluation unit 3 may determine, with reference to the changes in the position data PD over the course of time, whether or not the road user VT with the movement characteristic, (e.g., of the transportation mechanism VM), is moving along the traffic route VR. If, for example, a road user moves at a speed of more than 50 km/h along a traffic section VS within the selected traffic route VR, it may be assumed that the road user VT is, for example, not on foot or traveling on a bicycle. In one possible embodiment, an application implemented in the mobile terminal 8 of the road user VT records position points $P_i$ along the traffic route VR during travel and sends these position points $P_i$ together with the identity ID of the road user VT to the evaluation unit 3 of the traffic management system 1 at regular intervals, (e.g., every two minutes). With a plausibility checking device, it is possible to detect whether the road user VT on the selected traffic route VR actually uses the transportation mechanism VM provided for the respective traffic section VS. The evaluation or validation may be carried out on the basis of the communicated position points $P_i$ and the movement speed V derived therefrom as well as with reference to stopping points or stopping times.

In one possible embodiment, a user symbol with attributes is displayed, for a road user VT or a group of road users VTG who are signed on together, at a current position along the selected traffic route VR on a display unit of the mobile terminal 8 to the respective road user or the respective road users. In one possible embodiment, the evaluation unit 3 may change the displayed user symbol and/or the attributes thereof dynamically as a function of the evaluated behavior of the road user VT. The attributes of the user symbol include, for example, traffic-typical pieces of clothing. The user symbol is, for example, an avatar representing the road user or the user group. The road user symbol VT-SYMB may change over time in accordance with the behavior, in particular traffic behavior, of the road user. The appearance of the displayed avatar or the displayed user symbol may change in accordance with the evaluated traffic behavior or behavior of the road user. For example, a road user VT who uses a bicycle as the transportation mechanism VM often and for a long time may be assigned a symbolically represented improved bicycle by the evaluation unit 3, which bicycle is displayed to the road user in a display on his mobile terminal 8. Various road users who form a team or a group VTG of road users VT, for example within a part of a town, may be given a common strip representing membership of the team. Through the changed user symbol and/or through the changing of attributes it is possible to additionally motivate individual road users VT or user groups VTG to use a specific transportation mechanism VM.

In one possible embodiment, the evaluation unit 3 brings about a reward of the road users VT based on the evaluated behavior of the road user VT or a road user group VTG. For example, a road user VT may be rewarded to the effect that he receives bonus points or bonus miles for specific transportation mechanisms, (e.g., within the public local transportation system, as a pedestrian, or cyclist). For example, a road user VT who behaves in an environmentally friendly way may be rewarded with virtual bonuses, (e.g., dynamic attributes), or real bonuses, (e.g. with a free or reduced-price train journey), by the evaluation unit 3. A further possibility in terms of reward is, for example, that a road user VT who behaves in an environmentally friendly way is allowed to use the user's transportation mechanism VM on particular traffic routes prohibited for other road users VT. For example, a road user who normally travels in an environmentally friendly way with a bicycle may be rewarded by the evaluation unit 3 by being allowed to use a priority lane within the town traffic with his passenger car as an alternative transportation mechanisms VM.

In one possible embodiment, the evaluation unit 3 may generate use statistics over a multiplicity of road users VT. In this context, for example, user numbers, frequency of use of transportation mechanisms VM, respective traffic routes VR, and similar are evaluated. These data may be used not only for traffic management but also for traffic planning.

In one possible embodiment, the evaluation unit 3 may calculate a traffic behavior display value VAZ for each road user VT, and when requested by the road user may communicate the traffic behavior display value VAZ to the latter, as illustrated in FIG. 3. For the calculation of the traffic behavior display value VAZ, not only are the transportation mechanism VM actually used by the road user VT taken into account, but also the event reports EM communicated by the road user VT and received by the evaluation unit 3 from the mobile terminals 8 of the road users. The traffic event reports EM may be additionally passed on to the traffic management control center 5 by the evaluation unit 3. Depending on the various event reports EM', the traffic management control center 5 may additionally actuate traffic management or directly actuate transportation mechanisms in order to promote the traffic flow. If, for example, a traffic accident is reported by various road users VT who are located at the same intersection, the traffic management control center 5 or a controller integrated therein may actuate traffic management devices, for example traffic lights, in such a way that the traffic flow is directed past the affected intersection. As a result, traffic jams owing to specific traffic events may be largely avoided, with the result that $CO_2$ emissions are additionally prevented.

FIG. 6 serves to clarify the method of functioning of the traffic management method. FIG. 6 depicts a traffic route between the starting point P0 and a destination P3. The traffic route VR includes a plurality of traffic sections VS1, VS2, VS3. Various transportation mechanisms VM may be provided for each traffic section $VS_i$, as illustrated in FIG. 7. For example, between a traffic route point $P_i$ and a traffic route point $P_{i+1}$, there may be the possibility of using a first transportation mechanism VM1, a second transportation mechanism VM2, or some other transportation mechanism $VM_x$. For example, for a specific traffic section VS, there is the possibility of traveling along the section on foot, by car, or with a bicycle.

Figure 8:
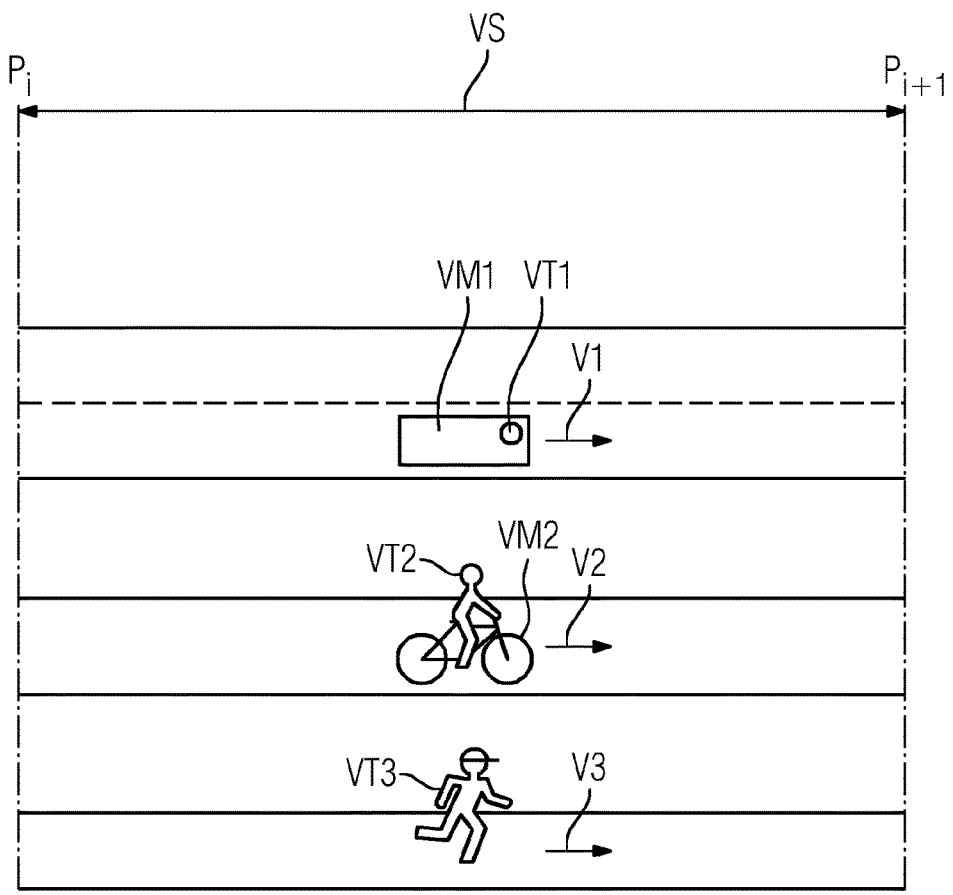

FIG. 8 depicts, for example, a road with a cycle path running alongside and a pedestrian path. A road user VT therefore has the possibility of traveling along this traffic section VS within the traffic route VR with the transportation mechanism VM1, (e.g., a passenger car), with the transportation mechanism VM2, (e.g., a bicycle), or with transportation mechanism VM3 (e.g., on foot). According to the selected transportation mechanism VM, the road user VT moves along the traffic section VS from the position point $P_i$ to the position point $P_{i+1}$ at a speed V1, V2, V3 for the transportation mechanism VM. In the illustrated example, the velocity V of the transportation mechanism VM1, (a passenger car V1), is higher than the velocity V2 of the transportation mechanism VM2, (a bicycle), which itself has a higher velocity than the velocity V3 of transportation mechanism VM3 (a pedestrian). With reference to movement speed V1, V2, V3 reached between the route points, in one possible embodiment, the evaluation unit 3 may validate the transportation mechanism VM taken by the road user VT. If, for example, a road user VT selects a traffic route VR whose route sections are to be traveled along with the transportation mechanism VM, a bicycle, but in fact uses a passenger car, in one possible embodiment, this may be detected by the evaluation unit 3 and be included negatively in the evaluation of the behavior of the road user VT. As a result, it is made more difficult for a road user VT to manipulate the evaluation of his traffic behavior. If a road user VT attempts to repeatedly falsify the evaluation of his behavior, in one possible embodiment he may be excluded from participation in the traffic management method.

Figure 4:
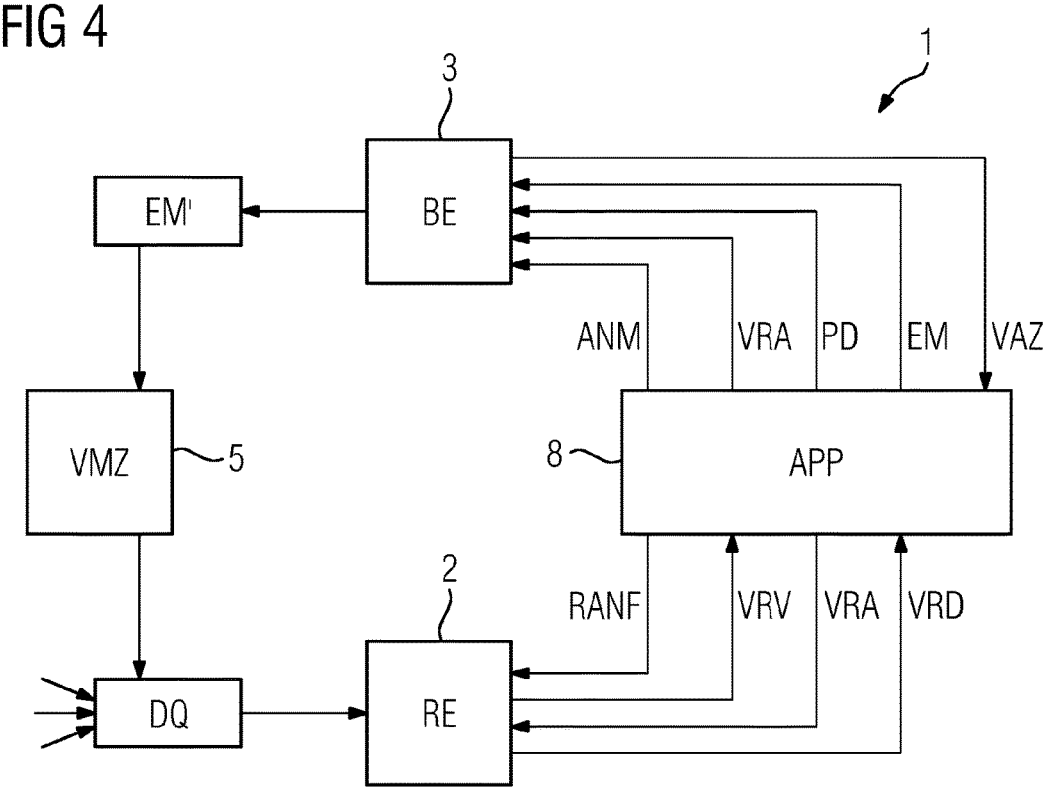
FIGS. 4 and 5 depict diagrams illustrating possible exemplary embodiments of the traffic management method and of the traffic management system.

FIG. 4 depicts an exemplary embodiment of the traffic management system 1. In the illustrated embodiment, intermodal routing or routing for multiple transportation mechanisms is performed by a routing unit 2. Firstly, the user or road user VT may sign on at the platform or evaluation unit 3. Subsequently, the user transmits a route request from his mobile terminal 8 to the intermodal routing unit 2. The routing unit 2 calculates route recommendations or traffic route recommendations taking into account current traffic data or navigation data from various data sources. Subsequently, a route selection is made by the user, wherein the selected route is transmitted to the routing unit 2 and the evaluation unit 3. In a further act, the route is transmitted, for the purpose of visualization on a map, by the routing unit 2 to the application running on the mobile terminal 8. The user or road user has the possibility of inputting location-related events or traffic-relevant events observed by the user into the user's mobile terminal 8 via a user interface, wherein the specified location-related events are transmitted in an event report from the application to the evaluation unit 3 and, if appropriate, also to the routing unit 2. The evaluation unit 3 may receive and evaluate various event reports EM from various road users VT. As a result, the reported traffic-relevant events may be verified and, if appropriate, also specified. Subsequently, the evaluated events are passed on to the traffic management control center 5. The evaluation unit 3 evaluates the behavior of the road user VT with reference to the communicated events and the transportation mechanism VM taken by the road user VT and for this purpose in one possible embodiment calculates a traffic behavior display value VAZ that may be interrogated by the user.

In the exemplary embodiment of the traffic management system 1 illustrated in FIG. 4, the intermodal routing unit 2 may access different data sources. For example, the routing unit 2 may access traffic reports relating to the individual traffic IV and/or may access data relating to public transport.

Figure 5:
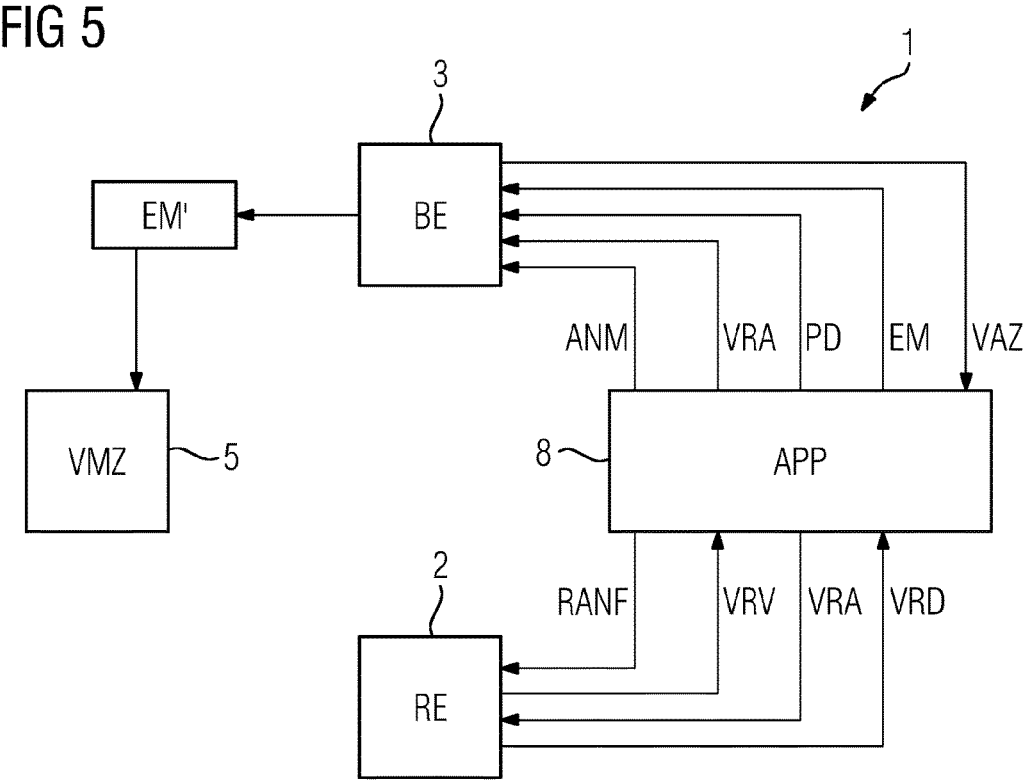

FIG. 5 depicts a further exemplary embodiment of the traffic management system 1. In the illustrated exemplary embodiment, the routing unit 2 is a transportation-specific routing unit for a specific transportation mechanism, for example, only for bicycles.

An advantage of the traffic management system 1 is that the road users VT are given an incentive to use transportation mechanisms VM that are as environmentally friendly as possible between a starting point and a destination of a traffic route VR. As a result, the $CO_2$ emissions and nitrogen emissions may be reduced, in particular in urban areas. Furthermore, noise emissions or noise loads may be reduced as a result. Because the road users VT are also included in the traffic observation, the traffic flow within the area is additionally optimized. Improving the traffic flow in turn reduces the emission loads within the area further. A further secondary effect of the traffic management system 1 is that the health of the road users is also improved because the road users are given an incentive to use environmentally friendly and at the same time health-promoting transportation mechanisms VM. The traffic data acquired from a multiplicity of road users may additionally be input into the traffic planning of transportation mechanisms VM within an area.

It is to be understood that the elements and features recited in the appended claims may be combined in different ways to produce new claims that likewise fall within the scope of the present disclosure. Thus, whereas the dependent claims appended below depend from only a single independent or dependent claim, it is to be understood that these dependent claims may, alternatively, be made to depend in the alternative from any preceding or following claim, whether independent or dependent, and that such new combinations are to be understood as forming a part of the present specification.

While the present disclosure has been described above by reference to various embodiments, it may be understood that many changes and modifications may be made to the described embodiments. It is therefore intended that the foregoing description be regarded as illustrative rather than limiting, and that it be understood that all equivalents and/or combinations of embodiments are intended to be included in this description.

The invention claimed is:

1. A traffic management method for promoting environmentally friendly transportation mechanisms, the method comprising:
communicating, by a routing unit to a requesting road user, calculated traffic route proposals having different transportation mechanisms;

receiving, from the road user, a selected traffic route from the communicated traffic route proposals;

supplying the road user with traffic route data relating to the selected traffic route, wherein a plurality of transportation mechanisms is provided for use by the road user for the selected traffic route;

receiving position data of the road user along the traffic route taken by the road user in order to validate a transportation mechanism used by the road user; and evaluating a behavior of the road user on the selected traffic route, wherein the behavior of the road user comprises the transportation mechanism used by the road user, a quantity of event reports supplied by the road user, and a quality of the event reports supplied by the road user, and wherein the behavior of the road user is evaluated based on the transportation mechanism used by the road user, the quantity of the event reports supplied by the road user, and the quality of the event reports supplied by the road user.

2. The method of claim 1, wherein, after receipt of a route request from the road user, the traffic route proposals are calculated by the routing unit for multiple transportation mechanisms or one specific transportation mechanism.

3. The method of claim 1, wherein a traffic management control center and/or to the routing unit receives, from the road user, location-related, observed traffic-relevant events in an event report.

4. The method of claim 3, wherein the routing unit calculates the traffic route proposals for road users as a function of traffic-relevant events communicated by a multiplicity of road users.

5. The method of claim 4, wherein the traffic-relevant events received from various road users at the same observation location are compared with one another in order to verify and/or specify the observed traffic-relevant event.

6. The method of claim 1, wherein, after reception of a route request from a terminal of the road user, the routing unit calculates the traffic route proposals for traffic routes based on navigation data and/or current traffic data and transmits the traffic route proposals to the terminal of the road user for selection of the traffic route.

7. The method of claim 6, wherein after reception of a route selection report for selection of the traffic route from the terminal of the road user, the routing unit transmits corresponding calculated traffic route data for the selected traffic route to the terminal of the road user, wherein the traffic route data is configured to be displayed on a display unit of the terminal of the road user, for visualizing the selected traffic route on a map of the road user.

8. The method of claim 7, wherein the route selection report is received by an evaluation unit, from the terminal of the road user, and wherein the evaluation unit evaluates the behavior of the road user with reference to the transportation mechanism used along the traffic route, the quantity of the event reports supplied by the road user, and the quality of the event reports supplied by the road user.

9. The method of claim 8, wherein, for the behavior of the road user, the evaluation unit calculates a traffic behavior display value based on emission values of the transportation mechanism used by the road user along the traffic route.

10. The method of claim 9, wherein a transportation mechanism with low emission values has a higher evaluation by the evaluation unit than a transportation mechanism with higher emission values.

11. The method of claim 8, wherein the quantity and the quality of event reports are communicated by the road user to the routing unit and/or a traffic management control center, and wherein each quality of an event report of the event reports represents a degree of detail of the respective event report.

12. The method of claim 8, wherein the evaluation unit performs a validation of the transportation mechanism used by the road user along the traffic route with reference to received position data of the road user.

13. The method of claim 8, wherein the road user or a group of road users sign on at the evaluation unit for the evaluation of their respective behavior.

14. The method of claim 1, wherein the road user or a group of road users is displayed as a user symbol at a current position along the traffic route on one or more display units of one or more terminals of the respective road users.

15. The method of claim 14, wherein the evaluation unit changes the displayed user symbol dynamically as a function of the evaluated behavior of the road user.

16. The method of claim 1, wherein the evaluation unit rewards the road user or a group of road users directly, or brings about a reward of the road user or the group of road users, based on the evaluated behavior of the road user.

17. A traffic management system for improving an evaluation of a behavior of road users, the traffic management system comprising:

a routing unit;

mobile terminals of the road users configured to transmit route requests to the routing unit, wherein the routing unit is configured to calculate, for each received route request, traffic route proposals comprising different transportation mechanisms, and communicate the traffic route proposals to the requesting road user, wherein the routing unit is configured to receive, from a road user, a selected traffic route, wherein a plurality of transportation mechanisms for use by the road user is provided for the selected traffic route;

wherein the routing unit is configured to evaluate the position data of the road user along the selected traffic route, in order to validate a transportation mechanism used by the road user on the selected traffic route, and evaluate a behavior of the road user, wherein the behavior of the road user comprises the transportation mechanism used by the road user, a quantity of location-related event reports supplied by the road user, and a quality of the location-related event reports supplied by the road user, and wherein the behavior of the road user is evaluated based on the transportation mechanism used by the road user, the quantity of the location-related event reports supplied by the road user, and the quality of the location-related event reports supplied by the road user.

18. The traffic management system of claim 17, further comprising:

an evaluation unit configured to perform an evaluation of the behavior of the road user as a function of the environmental friendliness of the transportation mechanism used by the road user and the quantity and the quality of the location-related event reports originating from the road user, wherein each quality of a location-related event report of the location-related event reports represents a degree of detail of the respective location-related event report.

19. The traffic management system of claim 18, further comprising:
   a control unit configured to control traffic management, transportation mechanisms, or both the control traffic management and the transportation mechanisms as a function of the behavior of the road users evaluated by the evaluation unit.

* * * * *